April 24, 1956  C. B. FRELLSEN  2,742,922
PILOT VALVE CONTROL FOR HYDRAULIC DISTRIBUTING VALVES
Filed April 19, 1952  2 Sheets-Sheet 1
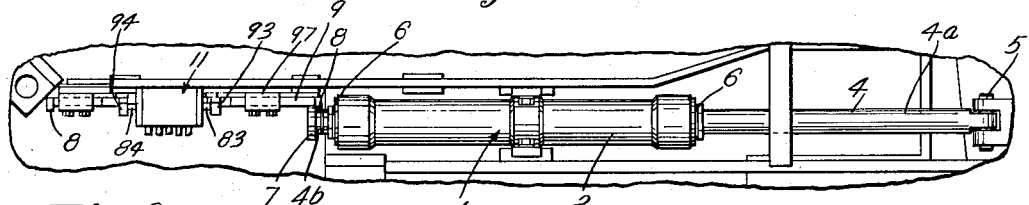
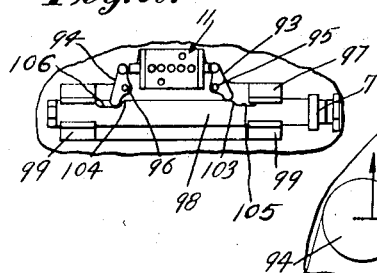
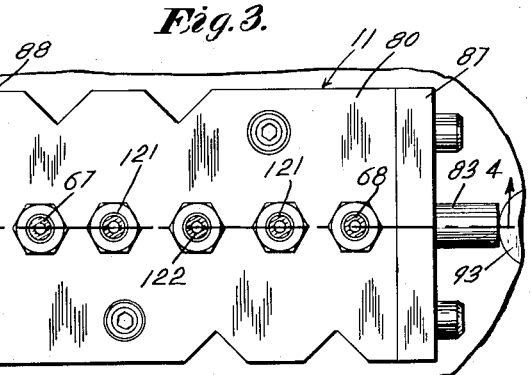
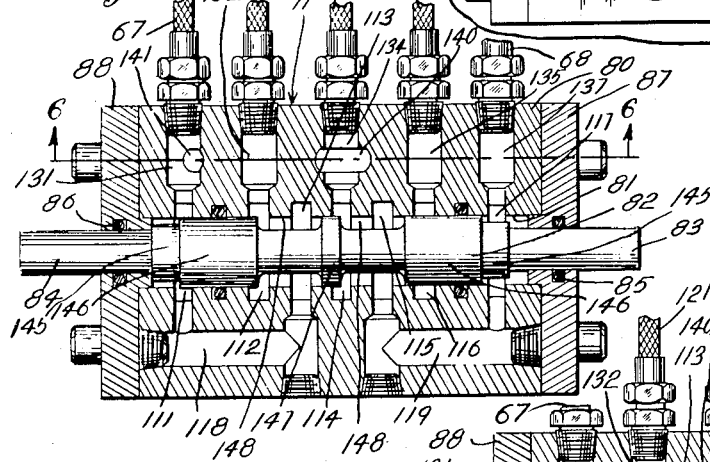
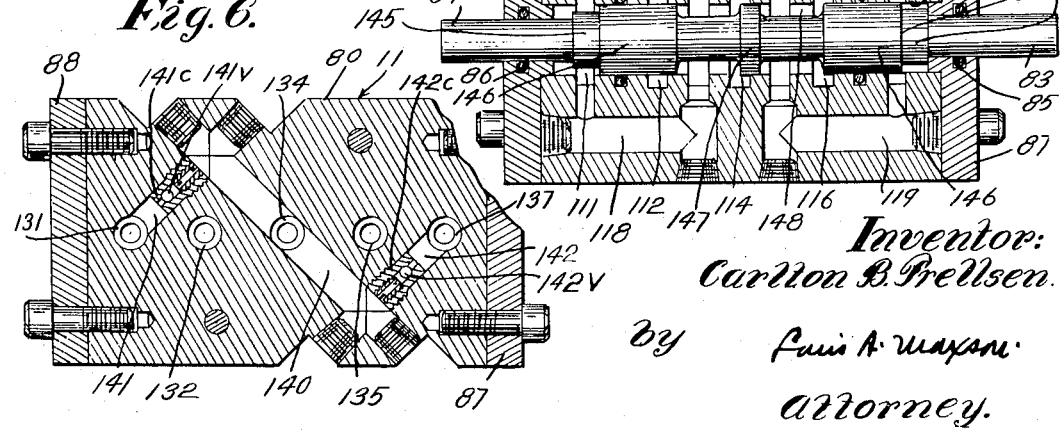
Inventor:
Carlton B. Frellsen.
by Paul A. Maxam.
attorney.

April 24, 1956

C. B. FRELLSEN 2,742,922

PILOT VALVE CONTROL FOR HYDRAULIC DISTRIBUTING VALVES

Filed April 19, 1952

Inventor:
Carlton B. Frellsen.
by
Louis A. Maxon.
Attorney.

United States Patent Office 2,742,922
Patented Apr. 24, 1956

2,742,922

PILOT VALVE CONTROL FOR HYDRAULIC DISTRIBUTING VALVES

Carlton B. Freilsen, Franklin, Pa., assignor to Joy Manufacturing Company, Pittsburgh, Pa., a corporation of Pennsylvania Application April 19, 1952, Serial No. 283,221

9 Claims. (Cl. 137—621)

My invention relates to hydraulic motors, and more particularly to pilot valve controlled distributing valves for such motors.

One of the important problems in the design of hydraulically actuated distributing valve mechanisms is to insure the completion of the movements of the valves. Where a pilot valve controlled distributing valve is used, complete throw of the main distributing valve may be taken care of, but the completion of the throw of the pilot valve from an intermediate position is not always simple.

It is an object of the present invention to provide an improved pilot valve controlled distributing valve mechanism for a hydraulic motor. Another object of the invention is to provide an improved positively started pilot valve mechanism for controlling a hydraulically operated distributing valve. A further object of the invention is to provide an improved mechanically started pilot valve for controlling a distributing valve, said pilot valve equipped with improved means for preventing its locking in an intermediate position between its opposite fully thrown positions. Another object is to provide an improved positively started pilot valve whose mechanical starting means will also, should occasion arise, positively complete pilot valve movement. Other objects and advantages of the invention will subsequently appear.

In the accompanying drawings in which one illustrative embodiment of the invention is shown:

Fig. 1 is a fragmentary top view of a hydraulically actuated motor and of the pilot valve which forms a portion of the fluid distribution means for the motor.

Fig. 2 is a detailed side elevational view of the pilot valve and the devices for mechanically initiating the movements thereof and for holding it in its opposite thrown positions.

Fig. 3 is an enlarged side elevational view of a valve chest containing the pilot valve.

Fig. 4 is a central longitudinal section on the plane of the line 4—4 of Fig. 3, through the pilot valve mechanism, showing the pilot valve proper in one of its extreme positions.

Fig. 5 is a corresponding sectional view with the pilot valve shown in its other extreme position.

Fig. 6 is a longitudinal sectional view on the plane of the line 6—6 of Fig. 4.

Figure 8:
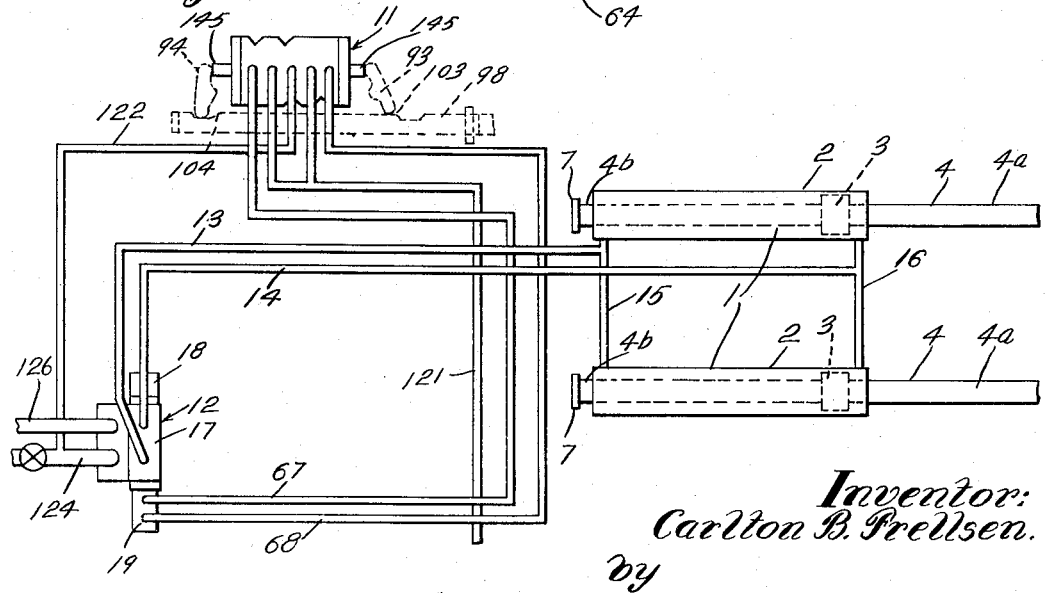
Fig. 8 is a diagrammatic illustration of the motor, the main distributing valve and the pilot valve which controls the latter.

Referring first to Figs. 1 and 8, it will be noted that a hydraulic motor 1, which is shown in Fig. 8 as of the two-cylinder type, comprises cylinders 2, 2, in which pistons 3, 3 are respectively reciprocable. The pistons 3, 3 have piston rods 4, 4 operatively connected with them, and each piston rod is of the character which has portions extending through the opposite ends of the cylinders in which the pistons reciprocate, suitable glands 6, 6 being provided for preventing leakage. Piston rods 4, 4 have portions 4a, 4a, which are adapted to be suitably operatively connected as shown at 5 to any mechanism which it may be desired to have the motor operate. The piston rods also include portions 4b, 4b, which may be termed tail portions, and which have, as shown, projecting portions in the form of flanges 7, 7 which are adapted to engage arms or dogs 8, 8 arranged in spaced relation on a control rod 9 for the pilot valve mechanism.

The valve mechanism for the supply and venting of fluid with respect to the opposite ends of the cylinders 2, 2 includes a pilot valve mechanism generally designated 11 and a main, hydraulic pressure-thrown distributing valve 12. The distributing valve 12 controls the alternate supply and venting of hydraulic fluid through conduits 13 and 14 which lead to cross connections 15 and 16 respectively, the cross connection 15 opening into the cylinders 2, 2 at one end and the cross connection 16 opening into the cylinders 2, 2 at their other end.

The distributing valve 12 may well be described in more detail before the pilot valve mechanism 11 is described. It comprises a valve chest 17 having heads 18 and 19 suitably secured to it as by screws 20. The valve chest element 17 has a valve-receiving bore 22 which is generally cylindrical and which has in communication with it a number of annular peripheral grooves. There are at least five of these, including a relatively wide central groove 24, which is a supply groove. At opposite sides of the central supply groove there are grooves 25 and 26 with which the conduits 14 and 13 respectively communicate through passages 27 and 28. Outside grooves 25 and 26 there are exhaust grooves 31 and 32. These exhaust grooves are connected by a passage 33 extending generally lengthwise of the valve chest 17 and connected with an exhaust line later mentioned in more detail.

Figure 7:
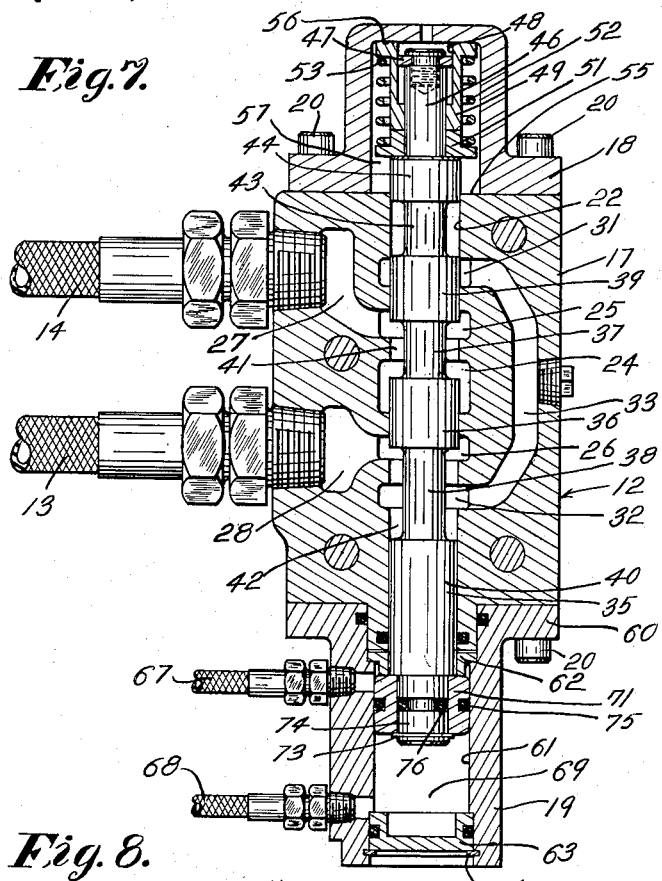
Fig. 7 is a central longitudinal sectional view through the main distributing valve and the throwing means for the latter.

The distributing valve proper is designated 35 and includes a central head 36 with which there are joined by reduced portions, 37 and 38 respectively, a shorter head 39 and a longer head 40. Grooves 41 and 42 respectively separate the heads 36 and 39, and 36 and 40. Outwardly of the head 39 there is another reduced portion 43 and a further head 44. The combined lengths of the heads 39 and 44 and of the immediate reduced portion 43 slightly exceed, as shown, the length of the head 40. Beyond the head 44, which plays a sealing and abutment function, there is a reduced stem portion 46 carrying at its outer end a ring 47 slidably received in the bore 48 of a thimble member 49. Between the thimble member 49 and the head 44, the stem 46 is surrounded by an annular spring abutment member 51. A spring 52 extends between the spring abutment member 51 and a flange or shoulder 53 on the thimble member 49. When the valve 35 is in central position the spring abutment member 51 engages an end surface 55 formed on the valve chest element 17 while the thimble member 49 engages an end surface 56 forming an end wall of a chamber 57 within the head element 18. As seen in Fig. 7, when the distributing valve occupies the position of that view, the abutment member 51 is forced away from the surface 55 and the spring 52 is compressed, with the result that it constantly tends in that position of the parts to return the distributing valve to mid-position. If the distributing valve were moved to its opposite extreme position, the spring 52 would be equally compressed because at that time ring 47 engaging the bottom of the bore 48 would pull the thimble member into the same relation to spring abutment member 51 while the latter would be resting on the surface 55.

Turning now to the other end of the main distributing valve, it will be noted that the head 19 is a generally tubular structure provided with a flange 60 secured to an end of the valve chest 17. A cylindrical bore 61 is formed in the head 19 and is closed at its inner end by a packing 62 surrounding the elongated head 40 of the valve 35, while at its other end a suitably packed head 63 is held in position by a snap ring 64. Conduits 67 and 68 lead to the opposite ends of a chamber 69 formed by the portion of the bore 61 between the packing 62 and the head 63, and a piston 71 is mounted between the head 40 and a snap ring 73 carried by a reduced annularly grooved projection 74 extending outwardly from the head 40. Suitable O-ring packings 75 and 76 are provided to prevent leakage past the piston 71. It will be evident that as fluid is supplied in turn through the conduit 67 and the conduit 68 and released through the one not serving for fluid supply, the distributing valve 35 will be moved in opposite directions and will effect alternate connection between the supply groove 24 and the conduits 14 and 13 leading to the motor 1, and concurrent alternate connection of the one of the conduits which is not serving as a supply passage, with exhaust.

Now turning to the pilot valve, which controls the supply and venting of throwing fluid to the conduits 67 and 68, the following is to be noted. The pilot valve 11 includes a chest 80 having a bore 81 in which a pilot valve element 82 is reciprocable. This pilot valve element has oppositely projecting stem portions 83 and 84 which extend through suitably packed openings 85 and 86 in valve chest heads 87 and 88. The stems 83 and 84 are adapted to be engaged by rocker elements 93 and 94, which are pivotally supported at 95 and 96 on a frame 97 which supports the pilot valve mechanism 11. The control rod, or valve actuating rod, 9, previously referred to as actuated by the dogs or projections 7, 7, is slidable in guides 99 in parallelism with the axis of the pilot valve structure and has sloping cam surfaces 103 and 104 to cooperate with the rocker elements 93 and 94. The cam surfaces 103 and 104 are at the adjacent ends of grooves or recesses 105 and 106 formed in the control rod 9, and, as one cam surface actuates its associated rocker element to push the pilot valve in one direction, the other rocker element is permitted by the adjacent groove or recess in the control rod 9 to move to provide clearance for the movement of the pilot valve. It will be evident that the pilot valve will be held in whatever position it may be moved to by this mechanism.

Returning to the structure of the pilot valve mechanism 11, it will be noted that the bore 81 is provided, as shown, between its ends with seven grooves or enlargements. These are numbered respectively 111, 112, 113, 114, 115, 116 and 117.

Grooves 111 and 113 are connected together by a passage arrangement 118, and groove 111 is connected with the conduit 67. Grooves 115 and 117 are connected together by a passage arrangement 119, and groove 117 is connected with the conduit 68. Grooves 112 and 116 are connected with an exhaust line 121. Groove 114 is connected with a conduit 122 which serves to supply fluid under pressure to the pilot valve mechanism. The reason for the employment of seven grooves and the passage arrangements 118 and 119 instead of a five-groove arrangement, with the connections 67 and 68 with grooves 113 and 115 is one of convenience of manufacture, of proportions of the pilot valve, and of providing for venting of the ends of the pilot valve receiving bore to permit valve movement.

A main fluid supply line 124 is connected with the groove 24 and a return line 126, leading to a reservoir (not shown), from which fluid is pumped to the supply line 124, is connected with the passage 33. Conduit 121 is also connected with the reservoir. Conduit 122 is illustrated as branching off of the main fluid supply line 124.

A passage 131 connects the groove 111 with the conduit 67. A passage 132 connects the groove 112 with the exhaust line 121. A passage 134 connects the groove 114 with the supply conduit 122. A passage 135 connects the groove 116 with the exhaust line 121. A passage 137 connects the groove 117 with the conduit 68.

A passage 140 extends obliquely through the chest 80 and intersects at its middle the passage 134. Passages 141 and 142 connect the passage 140 with the passages 131 and 137 respectively. Passages 141 and 142 are provided between their ends with check valve devices numbered respectively 141c and 142c each adapted to permit flow towards the passage 140, but to prevent reverse flow. The valves of the check valve devices 141c and 142c are numbered respectively 141V and 142V. The passages 140, 141 and 142 may conveniently be formed by boring, and their outer ends are suitably closed, as by plugging. It will be observed that fluid can flow from passage 131 and from passage 137 to passage 134 when the pressures in passage 131 and passage 137 sufficiently exceed the pressure in passage 134, i. e. the pressure in the supply line 122.

The pilot valve element 82, has at each end reduced stop portions 145, next to these portions relatively long heads 146, 146, and between the heads 146, 146 a central, relatively narrow annular portion 147. Grooves 148, 148 separate the heads 146, 146 from the annular portion 147. The grooves 148, 148 are not long enough to connect the annular supply groove with the vented groove 112 or 116.

The mode of operation of this apparatus will be readily understood. As the pistons 3, 3 attain to the position in which the pilot valve 82 is to be shifted from the position shown in Fig. 4 to the position shown in Fig. 5, force will be applied by the element 94 to the left end projection 84 of the pilot valve, and the pilot valve will start to move to the right. This will mean that the fluid at the right-hand end of the pilot valve will have to be displaced, and, since there can be no displacement through the conduit 68, the displacement must be through the passage arrangement 119 and back to the fluid supply conduit 122. There will be no difficulty about this, because the force mechanically exerted on the pilot valve will greatly exceed the amount needed to displace this fluid. If the annular portion 147 shuts off communication between the supply groove 114 and the groove 115 before a connection is established between the groove 115 and the vented groove 116, there would be a locking of the pilot valve 82 against movement, were it not for the fact that the check valve 142V would open and permit enough fluid to pass via passage 137, passage 142, passage 140 and passage 134 to permit continued movement of the pilot valve. After the right-hand head 146 commences to uncover the groove 116, and fluid flow is established between the supply groove 114 and the groove 113, the valve 82 will complete its movement as rapidly as the element 93 permits its movement. It will be evident that the pilot valve will normally complete its travel at the rate the mechanical control permits it to, but the mechanical control is always available to effect completion of pilot movement.

In like manner, it will be clear that on the opposite movement of the pilot valve the passages 131, 141, check valve 141c, passage 140 and passage 134 will prevent hydraulic locking of the pilot valve. Obviously, the connections of the grooves 113 and 115 one with the supply groove 114 and the other with the vented grooves 112 or 116 as the case may be will effect reverse movements of the main distributing valve 35 and maintain the motor pistons 3 in reciprocation.

The purposes of the check valve controlled connections 141, 140, between passages 131 and 134 and 142, 140 between the passages 137 and 134 will be appreciated be to to prevent fluid locking of the pilot valve in transit between its end positions, and there will be no harmful leakage because the check valves 141V and 142V will normally be maintained closed by supply line pressure and will require pressures very substantially above supply line pressure to exist in the spaces in the pilot valve mechanism wherein fluid tends to be trapped, to open the check valves. The arrangement described permits the use of a pilot valve which has its heads so spaced that simultaneous connection with supply and vent of throwing passages is precluded.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. In a pilot valve mechanism, in combination, a valve chest having a pilot valve-receiving bore having its ends closed against escape of fluid and provided with fluid supply and venting means including a pair of spaced connections for one of said functions and an intermediate connection for the other, a pair of work connections one of which includes a connection with said bore between said intermediate connection and one of said first pair of connections and the other of which includes a connection with said bore between said intermediate connection and the other of said first pair of connections, check valve controlled connections, bypassing said pair of spaced connections, leading from the ends of said bore to said intermediate connection providing for flow from the former to the latter and precluding flow through them from said intermediate connection to the ends of said bore, and a pilot valve movable in said bore between opposite extreme positions and having peripheral grooves operative in the opposite extreme positions of said pilot valve to connect said intermediate connection with said work connections in turn and to connect the work connection not connected with said intermediate connection with one of said spaced connections, said grooves being too short to connect said intermediate connection with either of said spaced connections.

2. In a pilot valve mechanism, in combination, a valve chest having in it a pilot valve-receiving bore having its ends closed against escape of fluid throughout the cross section of said bore, said valve-receiving bore having a supply connection between its ends for continuous free communication with a source of fluid supply and having at each side of said first connection a vent connection for venting of fluid from said bore, a pair of work connections each having connection with said bore between the supply connection and one of said venting connections and also having connection with the adjacent end of said bore, check valve controlled connections between the ends of said bore and said supply connection providing for fluid flow only from said ends to said supply connection, and a pilot valve movable in said bore between opposite extreme positions and having spaced peripheral grooves separated by an intermediate head and operative in the opposite extreme positions of said pilot valve in said bore to connect said supply connection with said work connections in turn and to connect the work connections not connected with said intermediate connection with one of said vent connections, said grooves too short to connect said supply connection with either of said vent connections.

3. In a pilot valve mechanism, in combination, a valve chest having a pilot valve receiving chamber provided with fluid supply and venting means including a work connection and, at opposite sides of said work connection, supply and discharge connections, said valve chest also having a free connection between said work connection and one end of said chamber and a check valve controlled connection bypassing said discharge connection and extending between said supply connection and said end of said chamber and providing for flow from said end to said supply connection but precluding reverse flow, and a pilot valve fitting and movable in said chamber and having flow conducting means thereon operative to connect said work connection alternatively with said supply and discharge connections, but too short, in the direction of valve movement, to connect said supply and discharge connections with each other.

4. In a pilot valve mechanism, in combination, a valve chest having a pilot valve receiving chamber provided with fluid supply and venting means including a work connection and, at opposite sides of said work connection, supply and discharge connections, said valve chest also having a free connection between said work connection and the end of said chamber nearer thereto and a check valve controlled connection between said supply connection and said end of said chamber bypassing said discharge connection and providing for flow only from said end to said supply connection, and a pilot valve fitting and movable in said chamber and having flow conducting means thereon operative to connect said work connection alternatively with said supply and discharge connections, but too short, in the direction of valve movement, to connect said supply and discharge connections with each other.

5. In a pilot valve mechanism, in combination, a valve chest having a pilot valve receiving chamber provided with fluid supply and venting means including a pair of spaced connections for one of said functions and an intermediate connection for the other, a pair of work connections one of which includes a connection with said chamber between said intermediate connection and one of said first pair of connections and also a connection with the end of said chamber nearer that work connection and the other of which includes a connection with said chamber between said intermediate connection and the other of said first pair of connections and also a connection with the end of said chamber nearer that work connection, and check valve controlled connections between the ends of said chamber and said intermediate connections bypassing said pair of spaced connections and providing for flow only from the ends of the chamber to said intermediate connection, and a pilot valve fitting and reciprocable in said chamber and formed to connect each of said work connections alternately with said intermediate connection and the adjacent one of said spaced connections.

6. A valve chest for a pilot valve having a pilot valve-receiving chamber provided with fluid supply and venting means including a pair of spaced connections for one of said functions and an intermediate connection for the other, a pair of work connections one of which includes a connection with said chamber between said intermediate connection and one of said first pair of connections and the other of which includes a connection with said chamber between said intermediate connection and the other of said first pair of connections, and check valve controlled connections bypassing said pair of spaced connections and extending between the ends of said chamber and said intermediate connection and permitting fluid flow only from the ends of said bore to said intermediate connections.

7. A valve chest for a pilot valve having a pilot valve-receiving chamber provided with a work connection and with fluid supply and discharge connections at opposite sides of said work connection and having free and check valve controlled connections respectively between said work connection and the end of said chamber nearer said work connection and between said end and said fluid supply connection, said check valve controlled connection limiting flow to the direction from the end of the chamber towards said fluid supply connection.

8. In a pilot valve mechanism, in combination, a valve chest having therein a chamber for guiding a pilot valve, said chamber having seven annular grooves communicating with it at points spaced longitudinally of it, the central groove a supply groove and having a connection for fluid supply thereto, the groove at either side of said central groove having a connection with the end groove at its own side of the longitudinal center of the chamber, said end grooves each having a connection for communication with a work line and the remaining grooves—those next to said end grooves—being exhaust grooves and having venting connections, check valve controlled connections between said end grooves and said supply groove providing for fluid flow only from the former to the latter, and a pilot valve in said chamber having peripheral grooves too short to connect the supply groove directly with either exhaust groove, but operative to connect the supply groove with the groove at either side of it and the other of said grooves at either side of it with an exhaust groove.

9. In a pilot valve mechanism, in combination, a valve chest having therein a chamber and a pilot valve reciprocable in said chamber, said chamber having in communication with it a supply port, an exhaust port, an intermediate port, and at the side of said exhaust port away from said supply port an end port for connection with a device to be controlled, a passage connecting said intermediate and end ports in free communication with each other, and a check valve controlled passage connecting said end port with said supply port and providing for fluid flow only from the former towards the latter, and said pilot valve having a fluid conducting depression in its periphery for connecting said supply and exhaust ports only alternatively with said intermediate port.

References Cited in the file of this patent

UNITED STATES PATENTS

| | | |
|---|---|---|
| 842,129 | Ball et al. | Jan. 22, 1907 |
| 2,184,793 | Clench | Dec. 26, 1939 |
| 2,342,450 | Campbell | Feb. 22, 1944 |
| 2,522,481 | Martin | Sept. 12, 1950 |
| 2,573,563 | Gardiner | Oct. 30, 1951 |